Reissued Mar. 24, 1942 Re. 22,050

UNITED STATES PATENT OFFICE 22,050

METHOD OF FORMING BASIC LININGS OF FURNACES

Giovanni Battista Crespi, Ceriana, Italy

No Drawing. Original No. 2,206,277, dated July 2, 1940, Serial No. 225,614, August 18, 1938. Application for reissue June 21, 1941, Serial No. 399,220. In Italy August 27, 1937

3 Claims. (Cl. 266—43)

This invention relates to a new and novel refractory lining for industrial furnaces. For simplicity of description a basic open hearth steel furnace is chosen although this invention is not limited to this type of furnace but may be used in furnaces for the production of ferro alloys, molten pig-iron mixers; basic "Bessemer (Thomas)" converters; induction furnaces of any frequency; electric arc furnaces of any type; cupolas, furnaces for cast iron; dolomite calcining, cement burning furnaces, whether of the continuous or intermittent type; furnaces for reheating of ingots, semi-finished or finished products of rolling mills; hearths, ports, walls and arches for furnaces of all types where material having a basic reaction is usable or desirable. These furnaces may be heated with solid, liquid or gaseous fuels, or electric arc or induction type of heating.

In furnace linings or structural parts having a chemically basic nature, it has heretofore been the practice to construct these refractory parts of costly magnesite. The construction of these linings or other parts consumes much time and the materials (bricks or sintered masses of magnesia) are costly and their maintenance is troublesome in view of the rapid wear. Sometimes silica bricks or blocks of silica are used. With these there is always the disadvantage which arises as a result of the falling off or spalling of particles of silica, onto or through the bath of material, with consequent damage to the basic hearth and ofttimes injurious to the material being treated in the furnace.

A variety of refractory materials has been used in the construction of various industrial furnace parts. For the hearth, dolomite, mixed with tar or with slag, has been employed. In the former case the material is prepared cold while in the second case the production is effected with the furnace operated at high temperature. Another method has been to construct a basic hearth to greater or less extent with magnesite brick and a surface or service lining superimposed thereon by fusing grain magnesite with oxides of iron, oxide-rich slags, etc., or such grain magnesite has been rammed almost cold after having been mixed with tar, linseed oil or other binders.

All admixtures or combinations with tar, oils, oxides of iron, slag, etc., have the effect of so reducing the fusing point of the refractory basic materials used that they may set or sinter into a solid or nearly solid mass. Further, unfortunately, they have the effect of so reducing the fusing point that, at furnace operating temperatures and conditions, ofttimes serious damage occurs. Thus in steel making practice, trouble with pitted and eroded bottoms, banks, walls, etc., are accepted as a hazard of the trade.

Lead refining furnaces offer another example of the difficulties encountered in basically lined furnaces. With magnesite brick or fritted grain magnesite bottoms, infiltration of lead between the interstices or granules is a constant hazard in the lead industry.

In electric furnaces of the induction type, the short life of basic linings, as heretofore practiced, is well known and in electric furnaces of the arc type, erosion of the bottom, especially under the bottom of the electrodes, is a source of expense and lost operation time. The necessity for relining such furnaces with basic material has arisen at frequent intervals.

The disadvantages above set forth are overcome by means of the present invention since all the refractory materials required in the construction may be utilized in the cold state, these materials comprising pure, that is, unadulterated calcined dolomite without the admixture of agglomerates of any kind, the materials being reduced to a fine grain and tamped into position cold, to produce a compact mass which will be transformed into a completely petrified body under the action of heat during the operation of the furnace.

For the purpose of maintaining the form of sloping or vertical parts of the furnace linings, iron wires, rods, etc., may be used, following much the same practice as known for concrete reinforcing. It is definitely not the purpose of this iron to act as a flux in combination with the dolomite.

Again for easy description, I remain with the typical example of a basic open hearth steel melting furnace. The process for the forming of the hearth in such a furnace is extremely simple. Upon the hearth plates there is spread a certain quantity of dolomite of fine grain, and this is tamped or pressed in any convenient manner, for example with the aid of tamps, to form a compact mass. For an open hearth furnace of twenty tons the above described operation can be carried out by eight workmen working for eight hours without the employment of any mechanical aid or heat. With the employment of the materials heretofore known for this purpose in the cold process the same number of workmen would require forty-eight hours, and in addition there would be required the use of a considerable quantity of tar. The tarred dolomite of the old practice must be tamped and formed in small successive layers with a constant reheating of the workmen's tools. The hot process hitherto carried out, involved still further expense as well as a considerable consumption of heat energy.

An examination of the hearths constructed in accordance with the present invention indicates that, even after one melt only, this hearth has the form of a petrified body in which the individual dolomite grains can hardly be recognized.

According to the present invention, the construction in fine grain calcined dolomite of furnace walls, ports and other slanting, vertical or hanging parts, while requiring somewhat more labor than the construction of the bottom itself, is also extremely simple. The fine ground dolomite is merely tamped in position behind suitable forms having the inner contour desired for the lining much in the same way as a foundry molder creates his form in molding sand. These forms, especially if prepared in metal, are available for use in the formation of other linings. During the first melting operation the dolomite lining material is completely petrified.

It will be obvious that the processes for the production of the hearths, the walls and the burner ports are very simple and do not involve either considerable manual labor or the consumption of considerable heat. The nature and scope of the invention is clearly defined by the following six points:

I. Heretofore, in basic reaction furnaces, a considerable part of the walls and roofs, etc., have been formed of acid material, for example, silica material. By the same token, under the present invention, in acid furnaces the walls, ports, roofs, etc., can be constructed of finely ground dolomite rammed in place cold.

The invention further includes the application of calcined dolomite according to the process described as a substitute for the usual refractory materials having a basis of dolomite, magnesia and the like in the construction of metallurgical and the like furnaces of the kind employing high temperatures.

II. Heretofore, in the use of dolomite as a refractory, users have desired that all fines be screened therefrom and at the most not allowing more than a maximum of 10%. This has been a source of loss whereas the present invention makes use exclusively of such fines. As is well known the preparation of fines from coarser calcined dolomite particles is simple and cheap. In the construction of sloping or vertical walls of basic furnaces, heretofore, calcined dolomite, consisting of about pea size or larger granules, has been mixed with slag or iron oxide and tamped into place, often with a further admixture of tar to first form the walls of electric or other furnaces. Thereupon the hearth was constructed in successive thin layers of dolomite mixed with slag or iron oxide and thus gradually built up of fritted material.

However, in the construction of basic hearths and all other parts bathed, for example by liquid steel or molten slag, the layers of dolomite formed, as just described, have been supported upon a reinforcement of bricks of magnesia as a necessary safety precaution.

With the new process no such reinforcement or backing-up is required.

III. The invention further includes a new process of employment which gives the best results and consequently widens the field of possible application, namely:

(1) The saving of a large part or all of the magnesia bricks often used in the construction of basic furnaces.

(2) The saving of magnesia and chromite pastes or plastic masses commonly used in the construction and maintenance of furnaces.

(3) The achievement of greater and uniform compactness in the linings produced by the new process.

Last but not least, the dolomite linings obtained by this invention retain the highly refractory properties of pure dolomite and are not subject to progressive crumbling. They are, therefore, adapted to being applied with advantage also to those parts of furnaces at present built with costly silica brick having an undesired acid reaction and/or other high priced materials such as magnesite and the like.

In addition to the application of dolomite material, according to the present invention for lead refining furnaces and open-hearth-and electrical-steel furnaces, above chosen merely as exemplifying applications of the present invention, the invention may also be applied to all other types of industrial furnaces wherein a basic reaction is desirable or admissible. As for example ferro alloying furnaces; hot metal mixers; basic Bessemer (Thomas) converters; electrical induction furnaces of any type or frequency; cupolas and furnaces for refining or treating cast iron, lead, aluminum, copper; dolomite roasting; cement burning and the like; furnaces for reheating or heat treatment of iron and steel or any other metals; hearths, ports, walls and arches for all types of industrial furnaces.

The invention is applicable, therefore, to all cases where a long life and a rapid construction is desirable, since it offers economy both in respect of hand labor and in the absence of undesired interruptions in the operation of the furnaces.

IV. The invention consists therefore in the use of calcined dolomite ground to the fineness of rice and flour, and cold pressed by means of suitable tamps. Strictly speaking no conglomerates or melting components are added. The mass thus formed acquires great compactness, so that after a short operation of the furnace it acquires great durability and a fracture not unlike that of marble.

V. As a particular example, in the formation of the hearth of a furnace, the dolomite is ground in a suitable mill to the fineness of rice grains and flour, and the hearth is formed by the application of successive layers pressed by means of tamps and starting from the bottom supporting plates and extending to the total required height, and without the addition of conglomerates or melting components. The compactness increases with the thickness of the hearth, but very good results are achieved even with comparatively small thicknesses.

VI. The invention is equally applicable for use in all other types of furnace where operations of this kind are conveniently employed, the methods adopted of course being varied to suit the diverse construction required. Refractory bricks of all kinds can also be constructed in an analogous manner, such bricks being of any convenient size, and the invention may also be employed in the construction of refractory copes and drags, casting molds and the like.

What I claim is:

1. A method of forming a basic lining in a hearth or in other structural parts of a furnace, which consists in applying finely ground pure calcined dolomite in cold condition in successive layers upon the inner face of the furnace to be treated, tamping said dolomite layers one after the other against said face by a suitable tool until a unified and compact lining is formed, and transforming said lining by action of heat during furnace operation into a petrified monobloc mass.

2. A method of forming a basic lining in a hearth or on other structural parts of a furnace, which consists in applying pure calcined dolomite ground to the fineness of rice and flour and in a dry and cold condition upon the inner face of the furnace to be treated, then tamping said material against said face by a suitable tool, thus forming successive layers until a unified and compact lining is formed, and transforming said lining by action of heat during furnace operation into a petrified monobloc mass.

3. A method of forming a basic lining in a hearth or on other structural parts of a furnace, which consists in applying without conglomerates or melting components pure calcined dolomite ground to the fineness of rice and flour and in a dry and cold condition upon the inner face of the furnace to be treated, then tamping said material against said face by a suitable tool and reinforcing said material by any suitable holding means, thus forming successive layers until a unified and compact lining is formed, and transforming said lining by action of heat during furnace operation into a petrified monobloc mass.

GIOVANNI BATTISTA CRESPI.